May 26, 1953  J. H. GREEN ET AL  2,639,465
AUTOMATIC MULTIPLE CAVITY MOLDING
WITH DIELECTRIC PREHEAT
Filed Jan. 12, 1949                                             6 Sheets-Sheet 1
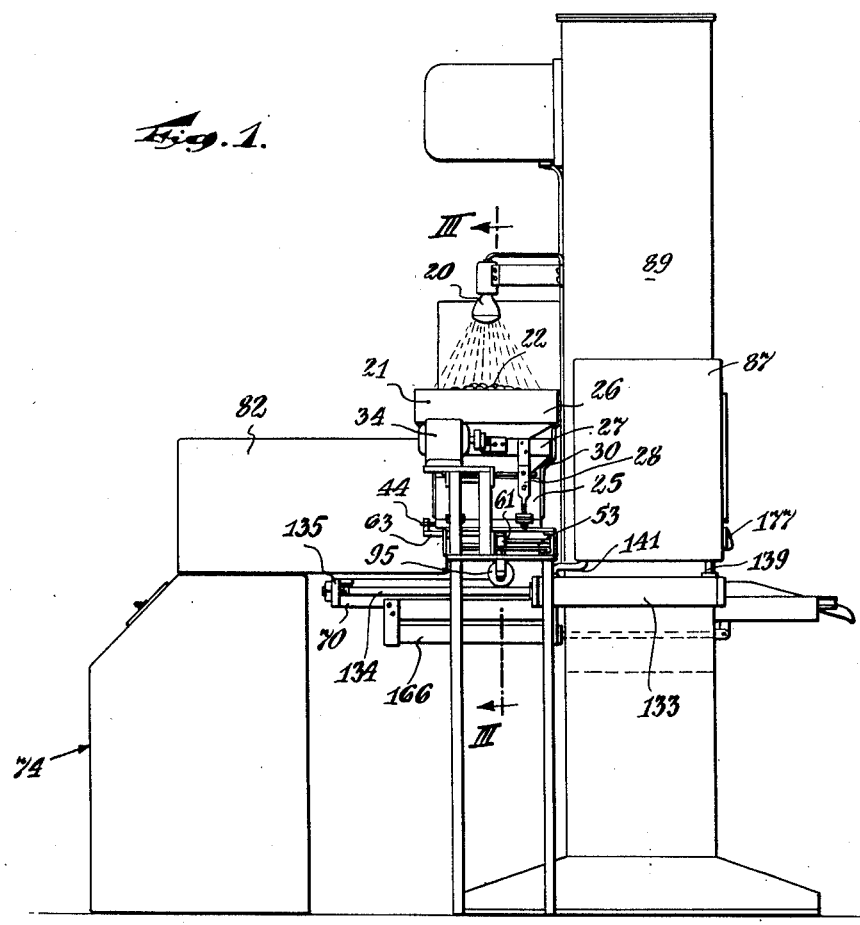
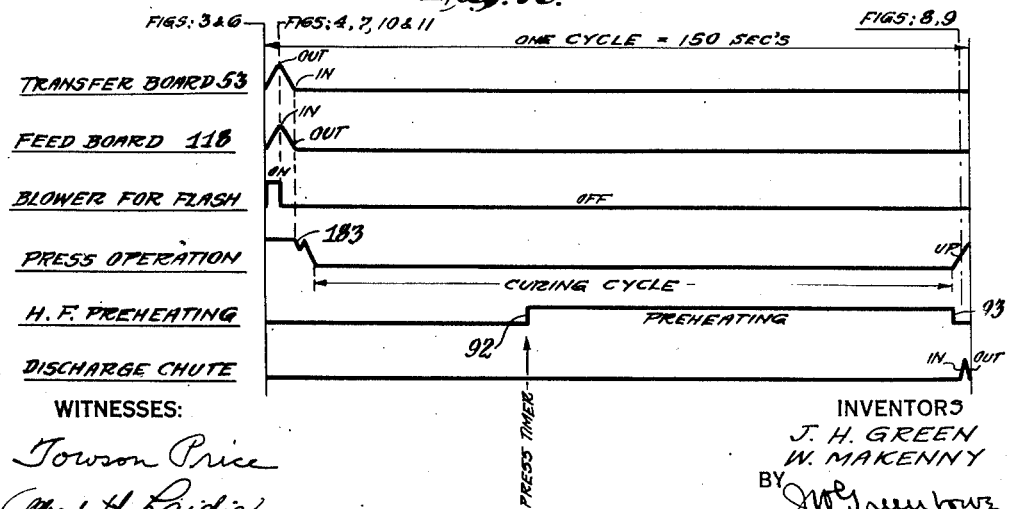

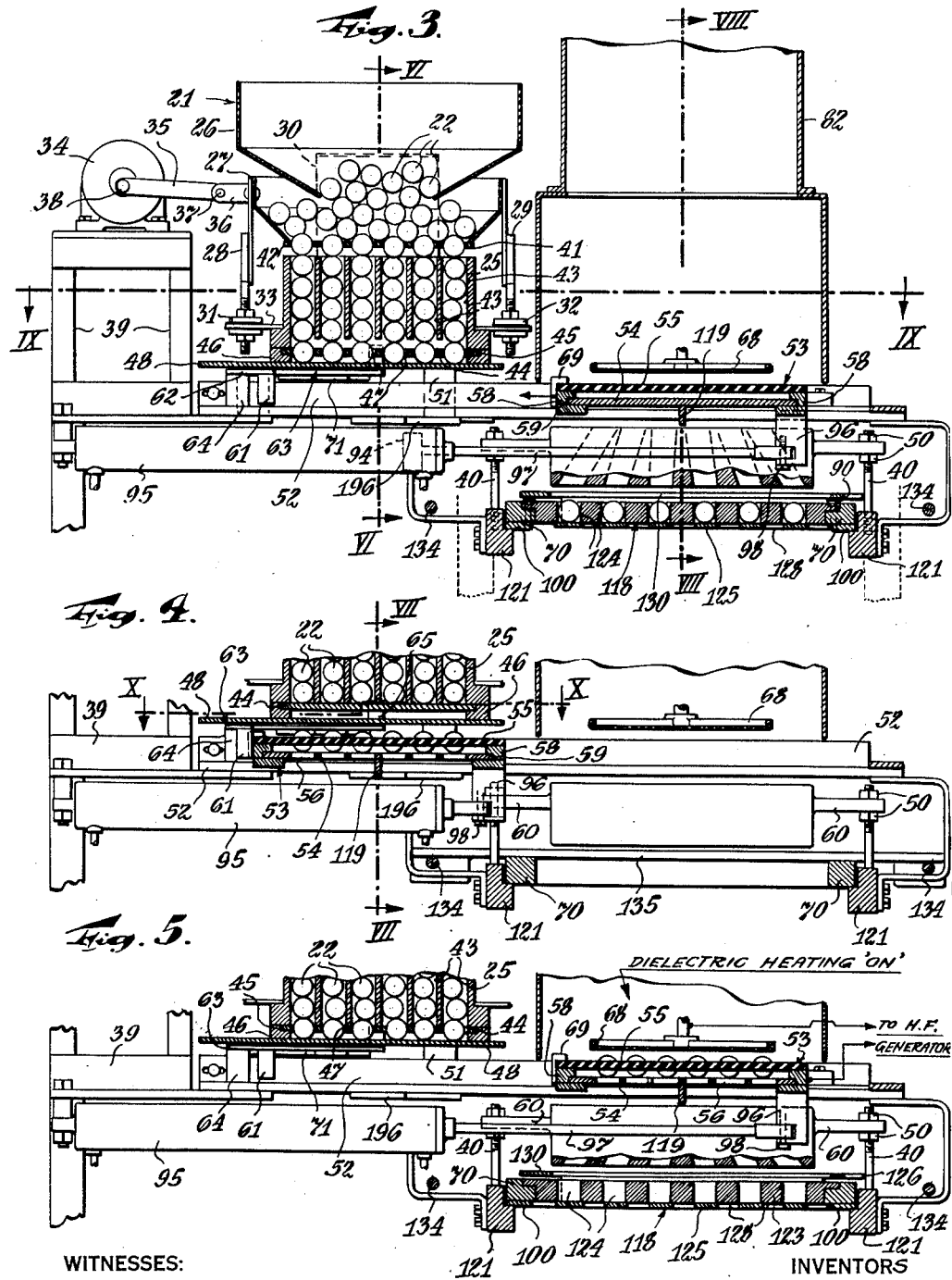

May 26, 1953   J. H. GREEN ET AL   2,639,465
AUTOMATIC MULTIPLE CAVITY MOLDING
WITH DIELECTRIC PREHEAT
Filed Jan. 12, 1949   6 Sheets-Sheet 3

WITNESSES:
Towson Price
Alfred H. Laudig

INVENTORS
J. H. GREEN
W. MAKENNY.
BY
ATTORNEY

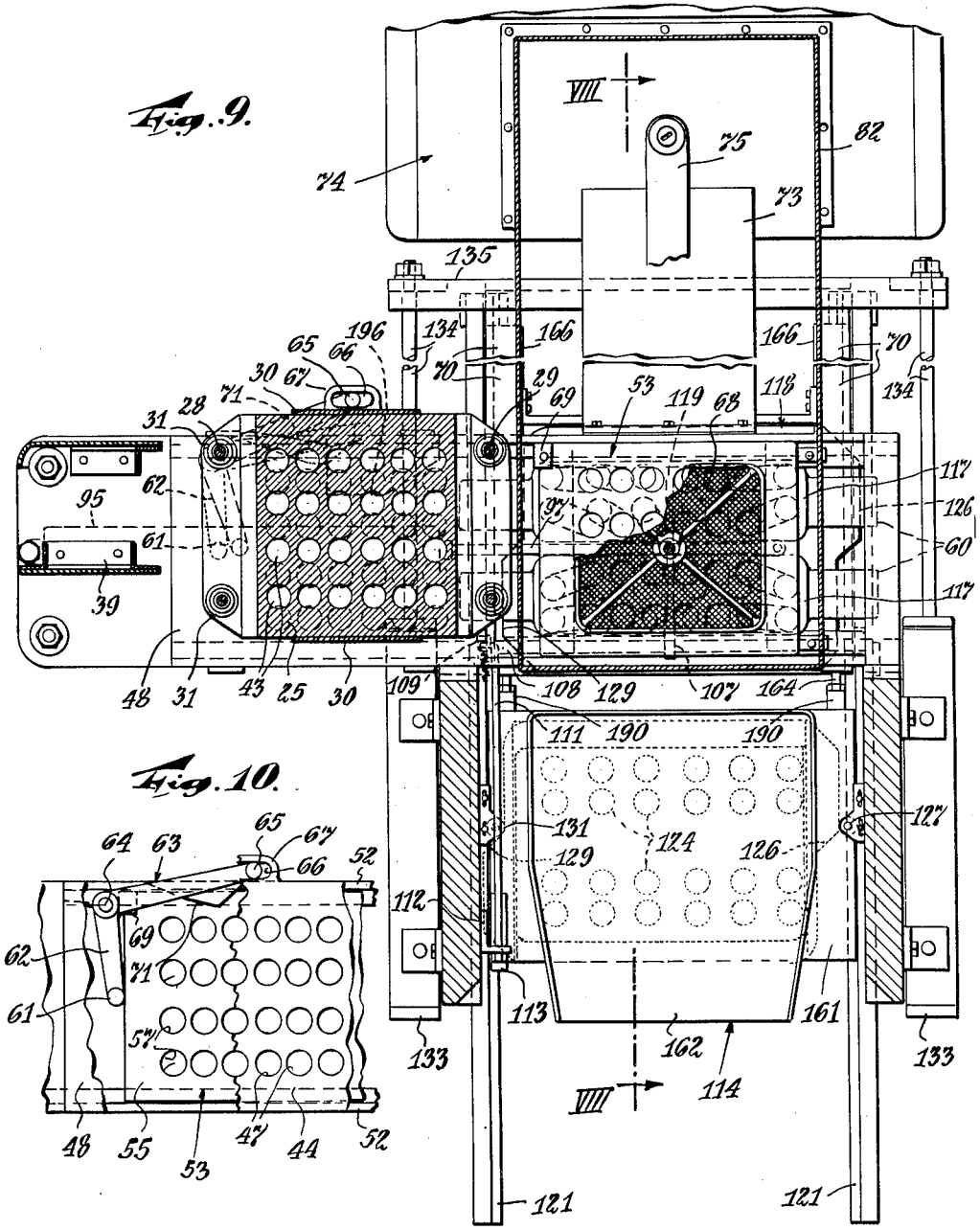

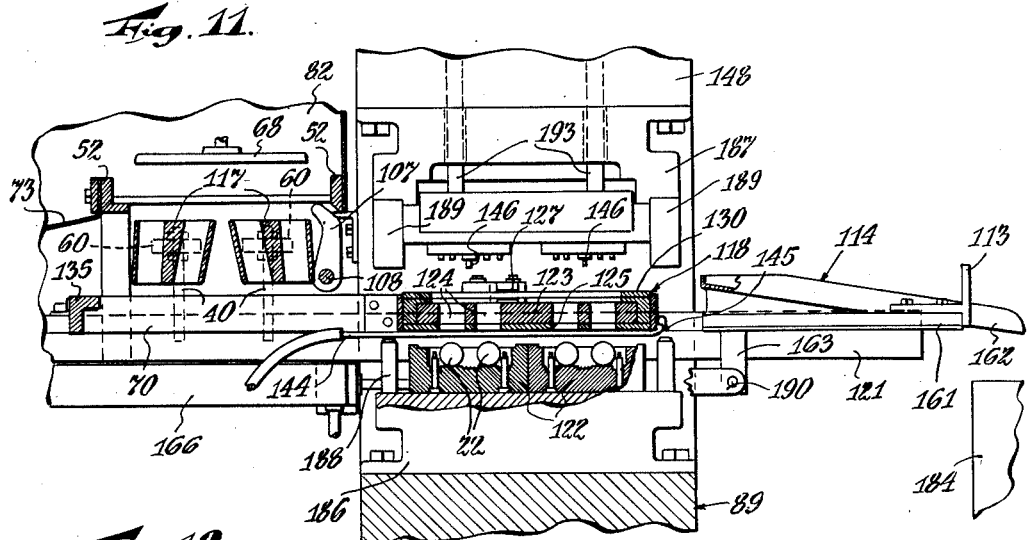
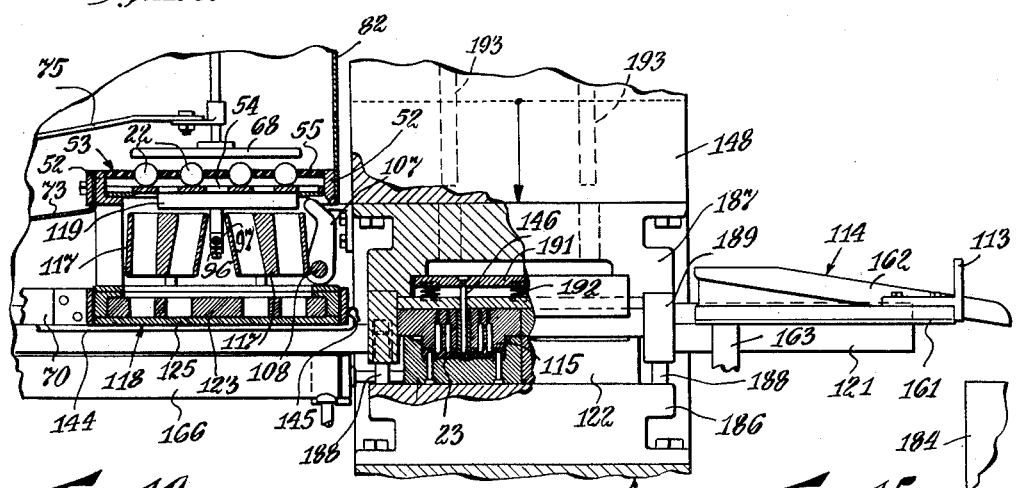
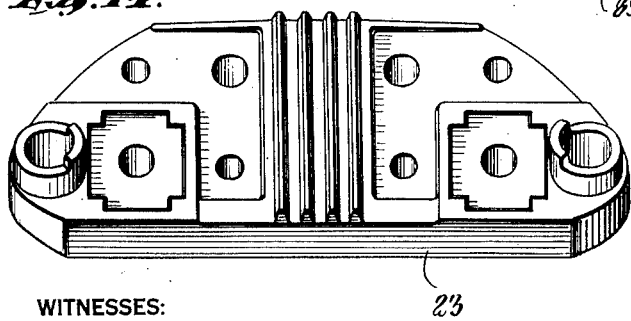
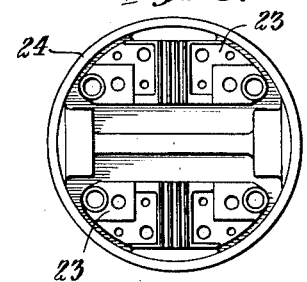

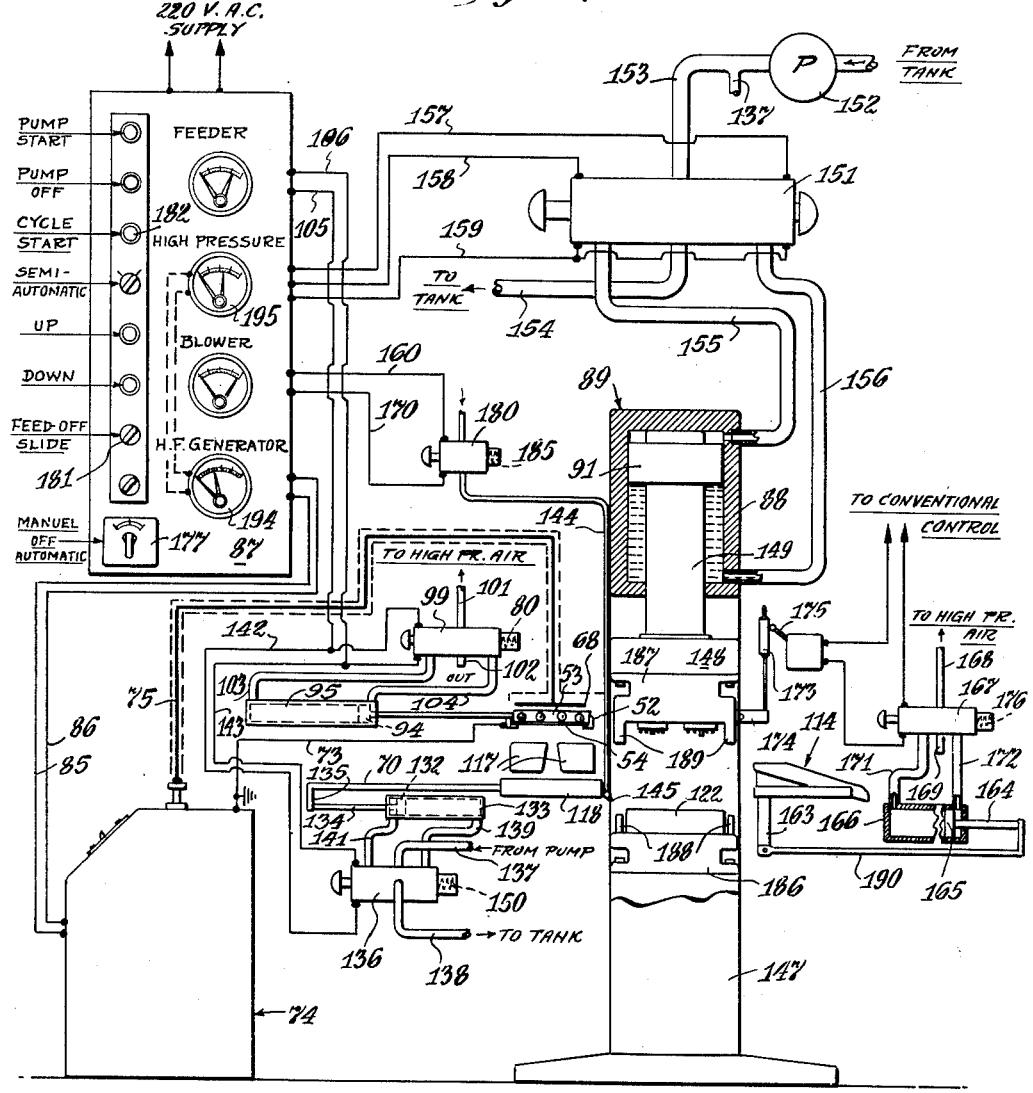

Patented May 26, 1953

2,639,465

UNITED STATES PATENT OFFICE 2,639,465

AUTOMATIC MULTIPLE CAVITY MOLDING WITH DIELECTRIC PREHEAT

James H. Green, West Orange, and William Makenny, Mountain View, N. J., assignors to Westinghouse Electric Corporation, East Pittsburgh, Pa., a corporation of Pennsylvania Application January 12, 1949, Serial No. 70,532

21 Claims. (Cl. 18—17)

This invention relates to the automatic molding of plastics and, more particularly, to means for automatically loading a molding press with relatively large tablets or spheres of plastic material of the phenolic resin type, such as that known in the art as "Bakelite" or "Micarta," and more particularly to molding relatively large articles, an example of such being a terminal block for use in such devices as relays, meters and other electrical instruments.

A principal object of our invention is a satisfactory automatic machine that will produce to specification such relatively large articles as electric terminal blocks, with an appreciable saving in molding time and quality improvement.

Another object of our invention is to provide for the automatic multiple cavity molding of relatively large devices using dielectric preheat with automatic feed and transfer mechanism.

A further object of our invention is to preheat sets of preforms while positioned relatively close together and quickly thereafter distribute the same along diverging paths to a board for feeding them directly to a molding press.

Other objects and advantages will become apparent as the description proceeds:

In the scale drawings:

Figure 1 is a side elevational view of apparatus embodying our invention.

Figure 2 is a diagrammatic view showing the sequence of one cycle of events which take place during operation of a machine such as shown in Figure 1.

Figure 3 is a vertical sectional view to a larger scale on the lines III—III of Figures 1 and 6 in the direction of the arrows, showing the parts in the position where plastic preforms are in a hopper ready for loading to a transfer board, and a set of said preforms, in a preheated condition, have just been discharged from said board to a feed board and are thus ready for movement into a press.

Figure 4 is a fragmentary sectional view on the line IV—IV of Figure 7, corresponding generally to Figure 3 but showing the next position of the parts where the transfer board has been moved back from over the feed board and loaded from the hopper, while the feed board has been moved into the press, and has actually discharged its load into the lower mold elements thereof as shown in Figure 11.

Figure 6:
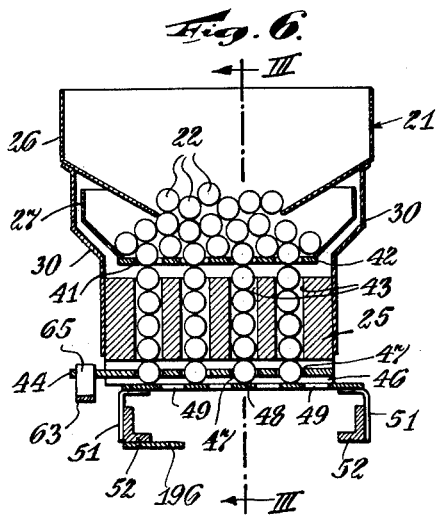

Figure 5 is a fragmentary view on the line III—III of Figure 6, corresponding generally to Figure 3, but showing the next position in which the transfer board has been moved from beneath the hopper to a position beneath the high-potential high-frequency dielectric-heating mesh electrode and also above the press feed board which has been returned to a position outside the press ready to receive a load at the end of the heating cycle.

Figure 6 is a vertical sectional view on the line VI—VI of Figure 3, in the direction of the arrows, but showing a position in which a charge of preforms have been received from the hopper in apertures in a cut-off plate.

Figure 7:
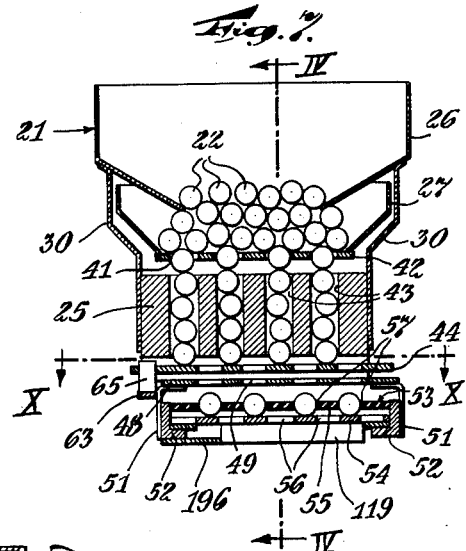

Figure 7 is a vertical sectional view on the line VII—VII of Figure 4, in the direction of the arrows, and corresponding with Figure 6 but showing the next position where the charge has been fed, by movement of the cut-off plate, through holes in an underlying valve plate to the transfer board.

Figure 8:
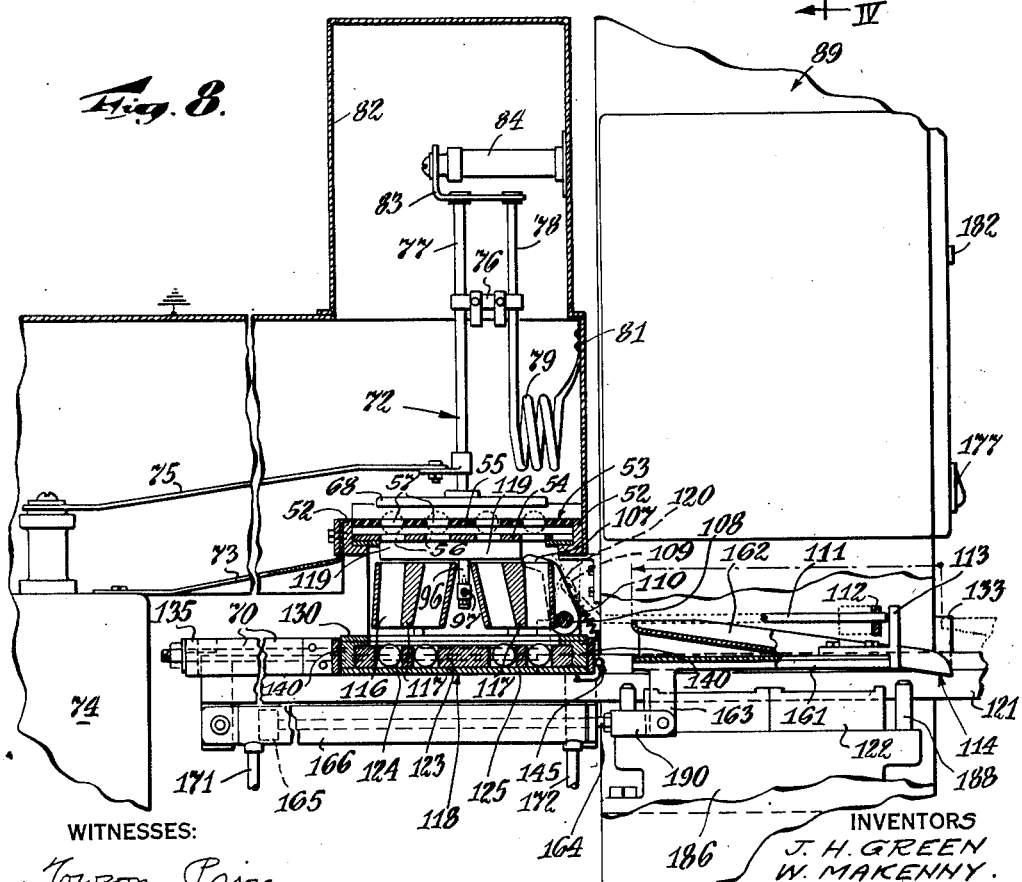

Figure 8 is a vertical sectional view on the line VIII—VIII of Figure 9 in the direction of the arrows, showing the press feed board filled with preforms, after reception thereof from the transfer board thereabove, and the discharge chute in position to receive the molded articles from the upper mold elements or forces of the press while in open position.

Figure 9 is a horizontal sectional view on the line IX—IX of Figure 3, in the direction of the arrows.

Figure 10 is a fragmentary horizontal sectional view on the lines X—X of Figures 4 and 7, in the direction of the arrows.

Figure 11 is a fragmentary view corresponding to Figure 8, but showing the parts in the position where the feed board has been moved into the press and has discharged its load of preforms into the lower mold elements thereof.

Figure 12 is a view corresponding to Figure 11, but showing the next position in which the feed board has been withdrawn from the press, and the transfer board with a load of preforms has been simultaneously moved to a position thereabove ready to dielectrically preheat its load prior to discharging its load thereinto, also showing the molding of the plastic material in the press.

Figure 13 illustrates partly schematically, the general assembly of the parts.

Figure 14 shows one of the objects, specifically designated a terminal block, which may be manufactured in accordance with our invention.

Figure 15 is a plan showing a meter housing with a pair of such blocks in position, on a scale reduced as compared with Figure 14.

The Whitmore et al. Patent No. 2,409,725, dated October 22, 1946, discloses a molding press which is automatic in the sense that pellets or preforms of plastic material after placing in a hopper are automatically fed to a press, the material thereof molded for a predetermined length of time, and the press automatically opened for the discharge of the molded articles. The Whitmore et al. Patent No. 2,454,362, dated November 23, 1948, discloses a press similar to that of said earlier patent, but improved in that it provides for a "breathing cycle," that is, the venting of gases from the mold interior and the contained moldable material, while the latter is in plastic condition. Such presses are admirably adapted for producing relatively small objects, such as radio base shells and the like.

However, for molding articles from preforms of relatively large size, it is desirable that the force necessary to compress the same to molded size, and the curing time thereof, be reduced by preform preheating prior to the molding operation. A multiple cavity mold using a large number of preforms for such an intermediate size object does not lend itself to an electronic preheat cycle with hand transfer, due to presetting (polymerizing) of the material prior to molding. No previous knowledge of automatic multiple-cavity molding with electronic preheat was available, so experiments were undertaken to evolve apparatus for the purpose. It was decided to adapt a 75 ton press, of the so-called Watson-Stillman type, for the purpose of carrying out the program.

The mechanism which we have evolved, as one embodiment of our invention, sacrifices the more effective and uniform preheating of flat preforms for two reasons: (1) Spherical preforms have less surface for cooling per unit of weight. (2) Spherical preforms are easier to handle, since they need not be oriented.

Therefore, the nearly spherical shape provided by a pill machine, of the so-called Stokes type, with no unusual tooling was used. The ball-shaped preforms are dumped into a large hopper to one side of the press, where they fall through a vibrating plate into vertical spacing holes in a thick casting, and are indexed into a transfer board by a cut-off plate. Power means then drives the transfer board along tracks to a position immediately above a distributor device overlying a press feed board. A high voltage high-frequency electrode is located immediately above this position, and the heating starts automatically. The end of the preheating cycle is so timed as to be coincidental to the opening of the press at the end of a previous molding cycle.

When the preheating is terminated and the press fully opened the standard unloading chute comes into position under the press head, and trips a linkage which dumps the freshly preheated preforms through holes in the transfer board into said distributor device comprising a pair of castings with diverging holes. These holes serve to guide the preforms to corresponding holes in the press feed board, where they have a much greater spacing than the transfer board. The inclination of the unloading chute is such that it directs the load of molded articles into a receptacle and, as it leaves the press, the feed board moves in and deposits hot preforms in the lower mold cavities. The feed board returns, the press closes, and the new terminal blocks or other articles are made, while the next load of preforms is heated by high-frequency power. When the press opens, the newly molded articles cling to the top forces or upper mold elements, until the unloading chute moves into position, then knock-out pins move the molded articles so that they drop down on and pass along the chute into a barrel or other receptacle.

Having given a brief description of the operation of an embodiment of our invention, we will now list the elements or subcombinations which may be included in a preferred embodiment.

1. A preform hopper with a vibrating apertured bottom plate or funnel, a drying lamp thereabove, a thick apertured, preferably light-metal casting for lining up and temporarily storing plastic pellets or preforms, and for feeding them to a transfer board, a cut off plate, and a valve plate.

2. A transfer board and power operating mechanism for moving it, while loaded with pellets from the feed hopper, to a position where said pellets are preheated dielectrically under a high-voltage electrode, with the lower element of the board being conductive and grounded to function as the other electrode.

3. High-frequency preheating apparatus comprising said dielectric heater electrode, an oscillator, and a coaxial transmission line to top electrode.

4. Relatively thick distributing castings, preferably formed of light metal, with diverging holes forming dispersion tubes to guide the pellets, as they are discharged from the transfer board, to the press feed board.

5. A press feed board, associated blower device and power operating means, for moving preheated pellets from beneath the transfer board to a position between the elements of the press, while cleaning the lower elements thereof by a blast of compressed air, and then automatically discharging a load of pellets into said lower mold elements.

6. A hydraulic press and operating mechanism therefor.

7. A discharge chute and operating mechanism therefor.

8. Timing mechanisms and actuating electrical apparatus for coordinating the operation of said elements.

The parts above enumerated are thus interconnected electrically and mechanically, and employ timing devices and solenoids, so that they operate in a predetermined sequence, one cycle of which is represented graphically in Figure 2. Broadly speaking, the functions performed by the parts of the disclosed embodiment of our invention are as follows:

1. Assuming the loading hopper contains a supply of preforms of plastic material, there are fed a few at a time, through the apertured vibrating plate, to the distributor casting beneath the hopper, as represented most clearly in Figures 3 and 6, where said preforms are lined up vertically and horizontally spaced to correspond with the proposed spacing in the transfer board.

2. A charge of preforms is delivered through said distributor casting, a relatively-movable cut-off plate, and a valve plate to the transfer board, slidable from a position beneath said hopper to a position beneath the top plate of the dielectric heating apparatus, said loading being effected by relative movement between said cut-off plate and associated valve plate, upon movement of an operating bell-crank lever by engagement of said transfer board therewith whereby only the bottom preforms in the distributor casting are discharged to said transfer board, as illustrated in Figures 4, 7, 10, and 11. The board is cam-closed on outward movement.

3. The transfer board is moved from beneath the loading hopper to a position under the top electrode of the high-frequency heating apparatus, above the distributing castings, beneath which is positioned the press feed board for the reception of the heated preforms, as viewed in Figures 5 and 12. The power is applied to the heating electrodes after the cycle is more than one third complete, as represented in Figure 2.

4. The preforms, after being heated to the desired temperature, are released from the transfer board, by engagement of the press unloading chute with linkage which causes the lower plate of said board to move until the holes therein register with the preform-containing holes in the upper plate, and dumped through the distributing castings into the press feed board therebeneath, as represented in Figures 8 and 9.

5. The press feed board is moved into the then open press, while the compressed air pipe carried thereby cleans the lower mold elements by a blast of air. The charge of preforms is automatically dropped into the lower elements of said press as illustrated in Figure 11, by a roller on the press engaging a cam on the lower or preform supporting plate of the feed board and moving said plate laterally until its apertures register with the preform-holding apertures in said board, said roller and cam being shown in Figure 9.

6. The press feed board moves out of the press, while its lower plate is returned to preform-supporting position by a roller on the other side of the press engaging a corresponding plate-carried cam, and the press closes as illustrated in Figure 12, preferably with a "breathing" movement as indicated by the line after "Press Operation" in Figure 2, to mold the preforms into the desired articles, while the transfer board simultaneously moves from beneath the hopper with a fresh load of pellets to a position beneath the high-frequency heating plate, as viewed in Figures 5 and 12.

7. The press opens, the upper press elements or forces carrying the pressed articles therewith, while a discharge chute moves therebeneath, near the end of the cycle, as represented in Figure 2, and receives said articles which are discharged from the upper mold elements by plungers operating therein, while the next charge of preforms is simultaneously being discharged from the transfer board to the press feed board, as viewed in Figures 8 and 9, and the hopper and associated parts are in the position of Figures 3 and 6, preparatory to placing another load of preforms in the transfer board when it has been moved out to a position beneath the hopper for the start of another cycle.

*The preform hopper*

The initial step in the manufacture of articles from plastic material in accordance with our invention, and referring to the drawings in detail, like parts being designated by like reference characters, is to fill a hopper 21 with a supply of preforms 22. It is assumed that we, in the present embodiment, desire to manufacture electric terminal blocks 23, such as illustrated in Figures 14 and 15. In the latter figure, a pair of said blocks are shown mounted in a meter housing 24, said blocks weighing over 50 grams apiece. It is then necessary that each preform weigh over 25 grams, as two are to be used for making each block.

In order to insure that the preforms 22 are not moist, an infra-red drying lamp 20 is used directly over the preforms 22 in the hopper 21. The radiation from this lamp, desirably disposed about 12" above the top of the hopper, removes surface moisture from the preforms and reduces the possibility of arcing during the heating cycle. To insure that said preforms are fed regularly from the hopper 21 to the underlying casting 25, desirably formed of aluminum, said hopper is formed in two parts, an upper part 26 immovably supported from the casting 25 by side plates 30, and a movable lower or funnel portion 27 supported on uprights 28 and 29, having their lower portions imbedded in rubber bushings 31 and 32, supported through a plate 33 resting on the casting 25, so that they may be vibrated slightly in a horizontal direction.

Power means 34 shown as an electric motor, is connected to said lower hopper portion 27 by means of a rod 35, pivoted to a bracket 36 on the hopper portion 27, as by means of a pin 37, its other end being connected eccentrically to the motor shaft, as indicated at 38. The motor 34 is supported on suitable framework 39 and when operated vibrates the lower portion 27 so that preforms 22 are fed through the apertures 41 in the lower plate 42 of said hopper portion 27. The apertures are horizontally arranged in the present embodiment, compactly as six columns of four, reference being had to Figures 9 and 10, so that they are normally centered on the axes of the apertures 43 in the underlying casting 25.

The casting 25 is desirably relatively thick so that a plurality of preforms, in this instance four, may be lined up vertically in each aperture 43, providing a supply ready for immediate use. Preforms as a layer immediately therebelow, are received in apertures in a cut-off plate 44, slidable in grooves 45 provided by rails 46 underlying the casting 25. This cut-off plate is thus formed with apertures 47 on a pattern corresponding with those in the casting 25, as shown in Figures 3 and 6, adapted to be offset, only in the line of movement of said plate 44, from the apertures 43, so that the lines of preforms thereabove may be supported on said cut-off plate, as in Figures 4 and 7. Underlying the cut-off plate is, in turn, a valve plate 48 formed with apertures 49, corresponding, and normally registering, with the apertures 47 in the cut-off plate, when the latter is offset as in Figure 7, but normally offset, in the same way as the apertures 47 are in the position of Figure 7, with respect to the apertures 43 in the casting 25. Thus, said preforms are normally supported on valve plate 48, which is in turn supported by brackets 51 upstanding from rails 52 on which is adapted to slide a transfer board 53.

*The transfer board*

The transfer board 53 comprises a conductive, desirably metal lower plate 54 and an upper desirably insulative plate 55, which are respectively provided with apertures 56 and 57 on a pattern corresponding with that of the valve plate 48, but with the apertures 56 and 57 normally offset, laterally of the line of board travel, so that while the apertures 57 are alined with the apertures 49 when the board is in position beneath the hopper 21, the lower plate 54 normally supports preforms when fed to said transfer board. Said plates are, however, relatively movable so as to, when desired discharge said preforms from said transfer board. Such relative movement is provided by having the end or reinforcing members 58 provide grooves 59 in which the lower plate 54 may slide sufficiently so that the apertures 56 and 57 are brought into registry for the discharge of preforms when positioned on the board.

The transfer board 53 is loaded through the valve plate apertures 49 upon its reaching the end of its travel toward a position where it underlies the hopper 21. During this travel its lower plate 54 is moved from preform-release position, illustrated in Figure 8, to preform supporting position illustrated in Figure 12, by engagement of cam 196 with a downward projection 119 on the lower plate 54. This movement to position under the hopper causes said board to engage a depending prong 61 on the arm 62 of a bell crank lever 63 mounted on a pivot 64 extending from one of the rails 52. This, in turn causes a projection 65 in the other end of said lever 63, to slide in a slot 66 in a projection 67 on the cut-off plate 44, and move said plate from the position represented in Figures 3, 6, and 9, to that represented in Figure 10, to thereby align the apertures 47 with the apertures 49, as shown in Figure 7, and discharge a load of preforms into the apertures 57 of the board plate 55, where they are supported on the lower plate 54 of transfer board 53.

When the transfer board 53 has been loaded and is moved from a position under the hopper 21 to a position under the high-frequency electrode 68, as shown in Figures 5 and 12, it returns the cut-off plate 44 to its former position, where the apertures therein receive another set of preforms from the apertures in the casting 25, as illustrated in Figures 3 and 6, ready for the next loading operation, by a lug portion 69 on the board 53, riding over a cam 71 on the bell crank lever 63, and thereby moving said lever back to its initial position, as represented in full lines in Figure 9. This operation carries the cut-off plate 44 therewith, because of the engagement of the projection 65 in the slot 66 of the projection 67.

The transfer board 53 is automatically moved to and from its extreme positions at the proper times in accordance with events of the cycle illustrated in Figure 2, by piston 94 operating in an air cylinder 95, and connected to a portion 96 depending from said transfer board, through piston rod 97 and connecting pin 98. The air to the cylinder 95 is controlled by a four-way valve 99, shown in Figure 13, receiving the air from a pump or other source of high pressure air (not shown), through pipe 101, and discharging it after use in the cylinder 95, through pipe 102. The pipe to the back or head end of the cylinder is designated 103, and that to the front or rod end of the cylinder is designated 104. The valve 99 may be solenoid-operated, as one of the "Ross" type, and controlled from the timing mechanism, designated "feeder" on the timing board 87, through lines 105 and 106, and provided with a return spring 80. The operation of the piston 94 is thus synchronized with the movement of the other parts of the apparatus. The control of the piston 94 is thus similar to that of the piston 48 in the Makenny et al. Patent No. 2,197,528, dated April 16, 1940.

*The preheating apparatus*

Upon the transfer board 53 reaching the position illustrated in Figures 5 and 12, it underlies the upper electrode 68 of high-frequency heating equipment, generally designated 72. The lower electrode is provided by grounding the rails 52, thereby making the lower plate 54 of said transfer board an apertured lower electrode, cooperating with the electrode 68. The ground connection is indicated at 73 in Figure 8 and the high voltage connection to the electrode from the oscillator 74 is indicated at 75. An adjustable matching impedance is provided by the tuning slider 76 on parallel stub lines 77 and 78, and the coil 79, one end of which is connected to the line 78 and the other grounded, as indicated at 81. The lines 77, 78, and associated slider and coil are supported from the metal plate shielding enclosure 82 by a bracket 83 extending from insulator 84. The insulator 84 is supported on one of the walls of the enclosure 82.

The oscillator 74, desirably a standard Westinghouse 10 kw., 30 megacycle, high frequency generator, is connected by lines 85 and 86 to the control board 87, whereby it is interconnected with the control arrangement for the means which supplies fluid pressure, preferably in the form of oil, to the cylinder 88 of the press 89 for operating the piston 91 therein, so that power is supplied to the electrode 68 when the press timer operates, as at the point designated 92 in Figure 2, and cut off at the end of the preheating period by the oscillator timer, designated "H. F. Generator," as at the point designated 93.

*The dispersing castings*

After the preforms 22 have been heated for a proper length of time under the electrode 68 in the position represented in Figures 5, 8, 9 and 12, they are released to the dispersing or distributing castings or feed brackets 117, preferably relatively thick and formed of light metal such as aluminum, from the transfer board 53. These castings are desirably supported from the rails 121 by studs 49 extending therefrom and adjustably carrying nuts 50 between which are held flanges 60 extending from opposite ends of said castings. This release is effected by lateral movement of the lower conductive plate 54 thereof by corresponding movement of the arm 107. Said arm is fixed on, and rotates with, shaft 108 carrying an operating arm 109, normally held in its extreme release position, where the arm 107 is in the dotted position represented in Figure 8, by a return spring 110. An operating rod 111 guided in bracket 112, has its inner portion bent diagonally as indicated, with the extreme end pivotally connected to said arm 109 as indicated at 120. The rod 111 is moved by engagement of the upstanding lug 113 on the discharge chute 114, when the latter passes below the upper mold elements or forces, upon opening of the press to discharge the articles 23 which have been molded therein.

The counterclockwise rotation of the arm 107, as viewed in Figure 8, effects lateral movement of the lower plate 54 from the position shown in Figure 7, to that of Figure 8, by engaging a downward projection 119 on said lower plate, so that the apertures 56 therein are aligned with the apertures 57 in which the preforms 22 have been held. This allows a charge of preforms to drop downward through the apertures 116 in the dispersing castings 117, where they are distributed from the relatively compact relationship they occupied in the transfer board 53 for efficient heating, to the relatively separated positions they occupy in the press feed board 118, which arrangement corresponds with that desired for placing in the lower mold elements 122 of the press 89. These castings 117 not only disperse the preforms laterally of the line of movement of the transfer board 53, as illustrated in Figure 8, but also longitudinally of said movement as illustrated in Figure 3.

The press feed board

The press feed board 118 and the operating arms 70 to which it is secured as by bolts 96, are slidable on rails 121 from a position beneath the dispersing castings 117, where it is loaded with preforms 22, to a position above the lower mold elements 122 of the press. In the latter position it releases its charge of preforms, allowing two, in the present embodiment, to drop into each lower mold element, as shown most clearly in Figure 11. The use of two preforms for each mold element is here deemed desirable because of the elongated nature of the article being formed. However, if the articles to be molded are each relatively compact, or do not cover much area, it may be desirable to use only one preform apiece.

The feed board 118 generally is formed in two parts, an upper or interior body part 123 with a series of apertures 124 arranged to correspond with the exit or lower ends of the apertures 116 in the dispersing castings 117, as well as with the pattern of desired placing in the lower mold elements, and a lower plate and housing part 125. The latter not only has a lower wall supporting the body part 123, but an upper frame portion 130 connected to said lower wall by end members 140, as shown in Figure 8. Said housing part is movable transversely to the line of travel of the board 118 with respect to said body part 123, as it reaches the unloading position above the lower mold elements 122. This lateral movement to unloading position is effected by engagement of a cam 126, formed on the upper frame portion 130 of said part 125, by a roller 127 formed on a corresponding side of the press, as shown in Figure 9, upon movement of said press feed board into the press for the discharge of preforms therefrom.

The part 125 has a series of apertures 128, corresponding in arrangement with the apertures 124 in the upper part 123, but normally offset into preform-supporting relationship, as viewed in Figure 3. The operating arms 70 to which the board 118 is attached at its sides, desirably carry wear plates 100 which directly engage the supporting rails 121. Roller-induced movement of said part 125 shifts it laterally to cause the apertures 128 and 124 to align and release the preforms from the feed board, so that they drop into the lower mold elements as viewed in Figure 11.

In order to return the lower part 125 of the feed board 118 to preform-supporting position, the other side of the frame portion 130 is formed with a cam 129 which, upon movement of the feed board out of the press, is engaged by a roller 131 on the corresponding side of the press, which causes a lateral return movement of said lower part 125 to the normal or preform-supporting position illustrated in Figure 3.

The mechanism for causing the motion of the feed board 118 into and out of the press 89 involves pistons 132 operating in fluid-pressure preferably hydraulic cylinders 133 supported from the frame of said press. The rods 134 of said pistons are connected to a transverse operating member 135 to which the operating rails 70 from said feed board are secured by conventional means. The fluid to the cylinders 133 is controlled by a four-way valve 136 shown in Figure 13, receiving water or other fluid from a pump or other source of fluid pressure through pipe 137, and discharging it after use in the cylinders 133 through pipe 138.

The pipe to the back or head end of the piston is designated 139, and that to the front or rod end is designated 141. The valve 136 may be solenoid-operated, as one of the "Ross" type, provided with a return spring 156. It is controlled from the timing mechanism that controls the valve 99, designated "feeder" on the timing board 87, through lines 142 and 143, thereby synchronizing the operation of the piston 132 with the movement of the other parts of the apparatus. The control of the piston 132 is thus also similar to that of the piston 48 in the Makenny et al. Patent No. 2,197,528.

In order to insure that, prior to introduction of the preforms, the lower mold elements are free from dirt and debris, the press feed board 118 carries a high pressure air pipe 144 the outlet end, or that at the front or press-adjacent end of the board, being formed with nozzles 145. As the board moves into the press, air is automatically admitted to the pipe 144 and the nozzles 145 direct a blast thereof into the lower mold elements 122 and properly clean the same. The timing and duration of the air blast is controlled from that part of the timing board designated "blower" through lines 169 and 170 to solenoid-controlled valve 180 provided with a return spring 185.

The press

The tooling used, in the particular embodiment of the invention here illustrated, consists of twelve separable lower or cavity molds 122, and twelve separable top forces, or forcers. These mold parts are mounted respectively on lower plate 186 and upper plate 187 formed with telescoping guide means 188 and 189, and are drilled to receive electric cartridge heaters (not shown) for maintaining the mold elements at the desired temperatures for simple flash molding. Knock out pins 146 are included in the top forces to unload the finished articles from the press. These pins 146 are mounted on a stripper bar 191 which normally is released by return springs 192. The follower is moved down to eject the molded articles by plunger rods 193, automatically operated in a conventional manner. When first operating the press, it was found that the terminal blocks formed remained in the cavity portions of the mold, rather than as desired, being carried up by the top forces on opening of the mold. To correct this, the following was done to each top force. Inserts which had been used were taken out and grooves were formed in the two inserts that served to lighten the finished terminal block. The inserts used to mold the screw holes were then reverse tapered until the piece stayed on the top force.

The lower plate 186 is mounted on the stationary or base portion of the press, while the upper plate 187 is mounted on the movable upper portion 148 carried by the piston rod 149 depending from the piston 91. Fluid, such as oil, to operate the piston for opening and closing the press, is controlled by a four-way valve 151, shown in Figure 13, receiving fluid from a pump 152 through pipe 153, and discharging it after use in the cylinder 88 through pipe 154. The pipe to the upper or head end of the cylinder 88 is designated 155, and that to the lower or rod end of the cylinder is designated 156. The valve 151 may be solenoid-operated, as one of the "Ross" type, from the timing mechanism designated "high pressure" on the timing board 87, through lines 157, 158, and 159, a solenoid at each end being used in the present instance, rather than a solenoid at one end and a return spring at the other, as in connection with the valves 99 and 136.

The unloading chute

The unloading or discharge chute 114 is mounted to slide on the same rails 121 which carry the press feed board. It comprises a base or carrying portion 161 and an outwardly inclined chute portion 162. The inclination of the chute portion 162 is such that when the articles molded in the press are discharged thereinto, they will slide by gravity out of the press. The base portion carries downward projections 163 connected by conventional means 190 to the rods 164 of the operating pistons 165 moving in cylinders 166. They are desirably operated by air like the cylinder 95.

The air to said cylinders 166 is controlled by a four-way valve 167, like the valve 99 also shown in Figure 13. It receives air from a pump, or other source of high pressure, through a pipe 168, discharging it after use in the cylinders 166 through pipe 169. The pipe to the back or head end of the cylinder is designated 171 and that to the front or rod end of the cylinder is designated 172.

The valve 167 may be solenoid-operated, as one of the "Ross" type, and automatically controlled directly from the upper press member 148 by a cam device 173, carried by a bracket 174 thereon, and tripping of a trigger member 175 when it has opened, to admit fluid pressure through pipe 172 to the cylinders 166 and cause the discharge chute 114 to pass into the press and occupy the position shown in Figure 8. Removal of the chute from the press is caused in a similar manner, that is, by the cam 173 dropping below the trigger 175 and terminating the solenoid operation. A return of the valve 167 is effected by spring 176, thereby causing fluid pressure to pass through the pipe 171 to the head end of the cylinder, moving the piston back to the position illustrated in Figure 13, to effect a withdrawal of the discharge chute 114 from the press.

Timing mechanism

Part of the timing mechanism has been described under the preceding headings. The solenoids which have been mentioned are electrically connected with the timing or control board 87 so that they operate at the proper times in accordance with the settings. Each time the feed board 118 travels in to feed the press, the transfer board 53 leaves its normal position over said feed board and under the high-frequency electrode, and travels to the hopper, loads automatically and returns as the feed board returns. The operating air flow is restricted by valve (not shown) to the high pressure air pipe 101 to damp the motion of the board, thereby eliminating excessive mechanical shock.

The high frequency heating time is determined by the difference in setting between the high pressure timer and the high-frequency generator. The manual operation of the high-frequency generator is in no way affected by the timer adjustment in the automatic operation.

Operation in detail

In preparing to start a molding cycle, the pump 152 which supplies high pressure fluid to the molding press 89 should be started and the main selector switch 177 positioned on the timing board 87 of the molding press placed in first or manual position. The safety switch (not shown) controlling the high frequency generator 74 should be closed. A waiting period of five minutes, provided by an internal timer, is required for the filaments of the several tubes contained in the generator to arrive at safe temperatures.

The hopper 21 is filled with preforms and the infra red drying lamp 20 turned on to remove surface moisture from the preforms, thereby preventing the possibility of arcing during the dielectric heating cycle. The lamp is positioned at a distance of about twelve inches above the top of the hopper.

The main valve which supplies air to the varius air operating cylinders should be in full open position. The air valve, however, which controls the pipe 101 supplying air for movement of the transfer board 53, should be partly closed, so as to damp the motion of said board to avoid jolting the preforms therein. The feed selector switch 181 should be moved to feed position. This will cause the press feed board 118 to travel in over the mold cavities and will activate the air cylinder 95 of the transfer board 53 causing it to move said board under the preform hopper. This will result in a complete load of preforms being deposited in the transfer board. Movement of the selector switch 181 to off position will now cause the feed board 118 to return to its normal position beneath the dispersing castings 117, as shown in Figure 8, and the transfer board containing the preforms to move beneath the dielectric heating electrode 168, where its lower conducting plate 54, by virtue of the ground 73, serves as a lower electrode beneath the preforms in the transfer board.

To start automatic operation, the cycle start button 182 is depressed, after turning the selector switch on the high frequency generator to "automatic" position. The mold heaters should be adjusted so that the temperature on the bottom half of the mold is maintained between about 335° and 340° F. while that on the top half of the mold is maintained between about 340° F. and 345° F.

The timer 194 of the high frequency generator 74 should be set so that after the high pressure molding cycle starts, the "high pressure" timer 195 will energize and start the timing of the duration of high frequency heating at point 92 in Figure 2. The timer 194 will from there control the desired elapsed time before the dielectric heating, applied to the preforms being prepared for the molding cycle, is terminated at point 93. In the present instance, the molding cycle is assumed to be 150 seconds and the preheating time 90 seconds, although these times are subject to adjustment as desired. When the curing cycle, marked 137 sec's in Fig. 2, has been completed, the high pressure timer will shut off the high frequency generator and reset its timer for the next automatic cycle. It will be understood that the dielectric heating cycle is part of the high pressure curing time cycle, which the preform material gets after the preforms are actually deposited in the lower mold elements, thereby correspondingly shortening the time during which the press need be closed on said material. The exact timer settings depends upon the type of molding material used.

It is important that the heating plate or electrode 68 be maintained in a level position at all times with only a small clearance, say approximately ¼", between it and the top of the preforms when in position shown in Figure 8. If the heating plate should be deflected out of the horizontal position, or come in contact with the top of the preforms, arcing or burning will result. When the plate is cleaned or removed for any reason, care should be exercised to make certain that all sharp corners, wire edges, and roughness of any type, are removed.

Means are provided to remove the gases and vapors emitted from the preforms during the dielectric heating cycle. Such means causes a flow of dry air to avoid a deposit of moisture and resulting arcing.

Let us assume that the automatic molding cycle starts with the delivery of a charge of preforms 22 through the distributor casting 25 and is moved by the cut-off plate 44 actuated by the bell crank lever 63 through engagement of the transfer board 53 with the lug 64 depending from the arm 62 thereof, from the position of Figure 6 to that of Figure 7. The transfer board is "closed" as it moves outward, by the cam 96, so that it is in condition to receive the preforms. Said preforms drop into the apertures 57 of the transfer board 53 and are supported on the lower metal plate 54 thereof. This corresponds with the first part of the cycle shown in Figure 2, the transfer board being assumed to start from the position of Figures 3 and 6 where it is empty and underlies the dielectric heating plate 68, represented by the "in" position of the transfer board 53 at the beginning of the cycle of Figure 2 and the "out" position of the feed board 118.

The transfer board 53, having received a charge of preforms from the cut-off plate through the apertures 49 in the valve plate 48, as shown in Figure 7, moves back to the position of Figures 5 and 12, resulting in a return movement of the cut-off plate, through engagement of the cam 71 by said board, the positioning of the supported preforms under the heating electrode 68, and the simultaneous movement of the feed board 118, thereunder or to its "out" position.

When the cycle has advanced to position 92, as indicated in Fig. 2, the high-frequency preheating of the preforms is automatically initiated by the press timer. At the end of the setting of the oscillator timer, the preheating is terminated at position 93, as indicated in Figure 2. At this point also, the press 89 opens and the discharge chute 114 moves thereinto beneath the upper forces thereof, as indicated in Figures 8 and 9, and then out carrying the molded articles with it.

This inward movement causes engagement between the lug 113, the discharge chute and the rod 111, moving the transfer board tripping arm 107 through pivotal connection 120, arm 109, and shaft 108 on which said arms are mounted. This tripping arm movement slides the lower metal plate 54 to the position of Fig. 9 and results in a release of the preheated preforms from the position of Figures 5 and 12 through the passages 116 in the dispersing castings 117, to the receiving apertures 124 in the feed board 118, as shown in Figures 8 and 9.

The next operation is the movement of the feed board from its "out" position under the dispersing castings 117, to its "in" position above the lower mold elements 122, as shown in Figure 11. Said inward movement immediately follows the outward movement of the discharge chute 114, and is accompanied by an automatic release of high pressure air to the pipe 144 and a discharge of a blast from the nozzles 145 over the lower mold elements 122. This blast of air cleans the lower mold elements of dirt and debris, preparing them for the reception of the preforms 22 which are deposited therein immediately upon the feed board reaching the position of Figure 11, at the end of its inward travel, by the roller 127 riding over the cam 126 and moving the lower member 125 from preform-supporting position shown in Figure 8, to the release position shown in Figure 11. The feed board then almost immediately moves out of the press, being "closed" for the reception of the next set of preheated preforms by the roller 131 engaging cam 129.

The press then closes, compressing the preforms to mold the articles desired, as indicated in Figure 12. Said closing operation is preferably preceded by a partial closing and release, as indicated by the saw-toothed line, designated 133 in Figure 2. This provides for "breathing" the press, that is, releasing the gases from the mold elements and plastic material while the latter is still in a plastic condition, as disclosed in the Whitmore et al. Patent No. 2,454,362, previously referred to. The curing cycle, that is, the time the molding material remains under pressure, then goes on to completion for the approximately 137 seconds represented in Figure 2. After, however, a portion of said cycle is completed, the electrode 68 is energized to start preheating another set of preforms at the point marked 92 in said Figure 2, ready for the feeding to the press after discharge of the contained material.

At the completion of the molding cycle the press opens, the high-frequency preheating of the next set of preforms is terminated, and the discharge chute immediately moves in under the upper forces, tripping the transfer board release mechanism and dropping the preheated preforms into the press feed board 118. The molded articles 23 are removed from the top forces by the knock out pins 146, whereby they drop into said chute 114, which immediately moves out of the press and the articles 23 slide along the same into a barrel or other receptacle 134, completing the cycle.

Although a preferred embodiment has been disclosed, it will be understood that modifications may be made within the scope of the appended claims.

We claim:

1. Apparatus for molding plastic material comprising a preform hopper with a vibrating apertured bottom plate, means thereabove for removing surface moisture from preforms contained therein, a thick apertured light metal casting therebelow for lining up and temporarily storing plastic preforms and feeding them as needed, a cut-off plate therebelow and movable between preform-supporting and release positions, a valve plate below said cut-off plate, a transfer board for moving charges of preforms from said hopper, and mechanism operable upon movement of said transfer board under said hopper to move said cut-off plate to release position.

2. Apparatus for molding plastic material comprising a hopper for receiving and distributing preforms thereof, a funnel beneath said hopper, the lower wall portion of which is apertured for feeding said preforms therefrom in accordance with a predetermined pattern, means for vibrating said funnel independently of said hopper, a horizontally movable cut-off plate formed with a series of apertures corresponding with the arrangement of the holes in said funnel, means for periodically moving said cut-off plate to either allow passage of preforms therethrough from said funnel or support preforms thereon, a valve plate underlying said cut-off plate and with a corresponding series of apertures normally offset from the apertures in said cut-off plate, whereby said preforms when received in apertures of said cut-off plate are normally supported on said valve plate, rails underlying said valve plate, and a transfer board movable along said rails so as to in one position periodically receive a charge of preforms through said valve plate, when said cut-off plate slides the received bottom layer of preforms and allows them to drop through the apertures in said valve plate into said transfer board.

3. Apparatus for molding plastic material comprising a hopper for receiving and distributing preforms thereof in accordance with a predetermined pattern, a transfer board movable along rails so as to in one position receive a charge of preforms from said hopper, said transfer board comprising a top plate with a series of preform-receiving apertures and a relatively movable bottom plate correspondingly apertured but normally disposed so that the apertures therein are offset from those in said top plate, whereby said preforms are supported thereon until relative movement of the bottom plate effects discharge thereof, high-frequency preheating apparatus comprising an upper dielectric heater electrode and an oscillator for feeding power thereto, and power means for moving said transfer board after reception of a charge of preforms therein to a position beneath said upper heater electrode, the lower one of said heater electrodes being formed by the bottom plate of said transfer board.

4. Apparatus for molding plastic material comprising a transfer board movable along rails so as to in one position receive a charge of preforms, said transfer board comprising a top plate with a series of preform-receiving apertures and a relatively movable bottom plate correspondingly apertured but normally disposed so that the apertures therein are offset from those in said top plate, whereby said preforms are supported thereon until relative movement of the bottom plate effects discharge thereof, high-frequency preheating apparatus comprising an upper dielectric heater electrode and a generator for feeding power thereto, power means for moving said transfer board after reception of a charge of preforms therein to a position beneath said upper electrode, the bottom plate of said transfer board forming a lower electrode cooperating with said upper electrode for preheating said preforms, and a relatively-thick distributing casting with diverging holes forming dispersion tubes to guide said preforms as they are discharged from the transfer board after preheating to means for feeding them to a molding press.

5. Apparatus for molding plastic material comprising a transfer board movable along rails so as to in one position receive a charge of preforms of said material and in another position be disposed for preheating said preforms by high-frequency heating, said transfer board comprising a top plate with a series of preform-receiving apertures and a relatively movable bottom plate correspondingly apertured but normally disposed so that the apertures therein are offset from those in said top plate, whereby said preforms are supported thereon until relative movement of the bottom plate effects discharge thereof, high-frequency preheating apparatus comprising an upper dielectric heater electrode and a generator for feeding power thereto, power means for moving said transfer board after reception of a charge of preforms therein to a position beneath said upper electrode, the lower plate of said transfer board being conductive and grounded to function as a lower electrode cooperating with said upper electrode for preheating said preforms, and a press feed board formed similar to said transfer board, but with its preform-receiving apertures more widely spaced, disposed beneath said upper dielectric heater electrode, and means for divergingly feeding said preforms after preheating, from said transfer board to said press feed board.

6. Apparatus for molding plastic material comprising high-frequency preheating apparatus with an upper dielectric heater electrode and a high frequency generator for feeding power thereto, a transfer board, power means for moving said board along rails so as to in one position receive a charge of preforms and in another position dispose said preforms under said electrode for dielectric heating, said transfer board comprising a top member with a series of preform-receiving apertures and a relatively-movable bottom plate with means to connect it to said high-frequency generator, to function as the lower one of the heater electrodes, correspondingly apertured but normally disposed so that the apertures therein are offset from those in said top plate, whereby said preforms are supported thereon until relative movement of the bottom plate effects discharge thereof, an associated molding press, means cooperating with said press for opening said transfer board, and a cam disposed along said rails for closing said transfer board upon return thereof for recharging, a press feed board formed similar to said transfer board for receiving preheated preforms from the latter, and power means for moving said press feed board, when the associated press is open to a position between the molding elements thereof and automatically discharging said preforms into the lower mold elements.

7. Apparatus for molding plastic material comprising a transfer board, rails along which said transfer board is moved so that it may in one position receive a charge of preforms, and in another position be disposed for preheating of said preforms, high-frequency preheating apparatus comprising an upper dielectric heater electrode and a high frequency generator connected for feeding power thereto, said upper electrode cooperating with a portion of said transfer board which is grounded to dielectrically heat said charge of preforms, a relatively-thick distributing casting with diverging holes forming dispersion tubes and disposed beneath said upper electrode to guide the preforms as they are discharged from the transfer board, and a press feed board formed similar to said transfer board but with preform-receiving apertures more widely spaced to receive said preforms as they are discharged through said distributing casting.

8. Apparatus for molding plastic material comprising a transfer board formed to hold preforms in closely-packed positions, an upper dielectric heater electrode of high-frequency preheating apparatus, rails along which said board is movable so that it may in one position receive a charge of preforms and in another position underlie said electrode, an oscillator connected to said electrode for feeding power thereto, a press feed board formed similar to said transfer board, but formed to hold said preforms in more dispersed positions corresponding with those in which they are to be molded, for receiving said preforms after preheating, means between said transfer and feed boards when in preheating position for directing said preforms from one board to the other, a molding press, and power means for moving said press feed board when the press is opened to a position between the molding elements thereof and automatically discharging the preforms into the lower molding elements.

9. Apparatus for molding plastic material comprising a transfer board formed to hold preforms in closely-packed positions, an upper dielectric heater electrode of high-frequency preheating apparatus, rails along which said board is movable so that it may in one position receive a charge of preforms and in another position underlie said electrode, an oscillator connected to said electrode for feeding power thereto, a press feed board formed similar to said transfer board, but formed to hold said preforms in more dispersed positions corresponding with those in which they are to be molded, for receiving said preforms after preheating, means between said transfer and feed boards when in preheating position for directing said preforms from one board to the other, a molding press with upper and lower mold elements, power means for moving said press feed board when the press is opened to a position between said mold elements and automatically discharging the preforms into the lower molding elements, and a discharge chute for receiving the molded articles from the upper mold elements and removing them from said press.

10. Apparatus for molding plastic material comprising a transfer board formed to hold preforms in closely-packed positions, an upper dielectric heater electrode of high-frequency preheating apparatus, rails along which said board is movable so that it may in one position receive a charge of preforms and in another position underlie said electrode, an oscillator connected to said electrode for feeding power thereto, a press feed board formed similar to said transfer board, but formed to hold said preforms in more dispersed positions corresponding with those in which they are to be molded, for receiving said preforms after preheating, means between said transfer and feed boards when in preheating position for directing said preforms from one board to the other, a molding press with upper and lower mold elements, power means for moving said press feed board when the press is opened to a position between said mold elements and automatically discharging the preforms into the lower molding elements, a discharge chute for receiving the molded articles from the upper mold elements and removing them from said press, and timing mechanism including actuating electrical apparatus for coordinating the operation of said elements.

11. Apparatus for molding plastic material comprising a two-part hopper for receiving and distributing preforms thereof, the lower part of said hopper being formed as a funnel, the lower wall portion of which is a plate apertured for feeding said preforms therefrom in accordance with a predetermined pattern, means for vibrating said funnel part independently of the upper part, a relatively thick casting disposed beneath said apertured plate and formed with a series of normally vertical holes providing feed tube means for vertically lining up a series of said preforms in each hole and temporarily storing them prior to discharge therefrom, a horizontally-movable cut-off plate disposed beneath said casting and formed with a series of apertures corresponding in arrangement with the holes in said casting, means for periodically moving said cut-off plate to either allow passage of preforms therethrough from said casting or support preforms thereon, a valve plate underlying said cut-off plate and with a corresponding series of apertures, normally offset from the apertures in said cut-off plate, whereby said preforms when received in apertures in said cut-off plate are normally supported on said valve plate, rails underlying said valve plate, a transfer board movable along said rails so as to in one position periodically receive a charge of preforms through said valve plate, when said cut-off plate slides the received bottom layer of preforms from the said casting and allows them to drop through the apertures in said valve plate into said transfer board, said transfer board comprising a top plate with a series of preform-receiving apertures and a relatively-movable bottom plate, correspondingly apertured but normally disposed so that the apertures therein are offset from those in said top plate, whereby said preforms are supported thereon until relative movement of the bottom plate effects discharge thereof, high-frequency preheating apparatus comprising an upper dielectric heater electrode and an oscillator for feeding power thereto, power means for moving said transfer board, after reception of a charge of preforms therein, from a position beneath said hopper to a position beneath said upper dielectric heater electrode, the lower one of said heater electrodes being formed by the bottom plate of said transfer board, a press feed board formed similar to said transfer board, a relatively thick distributing casting with diverging holes forming dispersion tubes to guide the preforms to said press feed board as they are discharged from the transfer board, a molding press, power means for moving said press feed board when the press is opened to a position between the molding elements thereof and automatically discharging the preforms into the lower molding elements, a discharge chute, means for automatically moving said chute, after the preforms have been pressed to the desired shape in the molds and the upper mold elements raised, to a position beneath said upper mold elements to receive the molded articles after discharge and move them out of the press prior to subsequent closure of said press, and timing mechanism including actuating electrical apparatus for coordinating the operation of said elements.

12. The method of molding articles of plastic material comprising vibratingly feeding preforms of said material to temporary storage means, feeding said preforms from said storage means into compact assembly in transfer means, moving said transfer means from said storage means, and then preheating said preforms while in said transfer means, and then by gravity substantially simultaneously dispersing them to more widely separated position, corresponding substantially with the position in which they will be molded, in feeding means where they are held preparatory to placing them in molding means.

13. The method of molding articles of plastic material comprising feeding preforms of said material into compact assembly in transfer means, moving said transfer means to heating means, preheating said preforms by said heating means while in said transfer means, and then by gravity substantially simultaneously dispersing them to more widely separated position, corresponding substantially with the position in which they will be molded, in means where they are held preparatory to feeding them to a molding press.

14. The method of molding articles of plastic material comprising moving transfer means containing in compact assembly a load of preforms of said material to heating means, then preheating said preforms while in said transfer means, and then by gravity substantially simultaneously dispersing them to more widely separated position, corresponding substantially with the position in which they will be molded, in means where they are held preparatory to feeding them to a molding press.

15. The method of molding articles of plastic material comprising preheating preforms of said plastic material while in compact assembly, then by gravity substantially simultaneously dispersing them to more widely separated position, corresponding substantially with the position in which they will be molded, in feeding means where they are held preparatory to feeding them to a molding press, moving said feeding means and discharging the preforms therefrom into the lower mold elements of a press, and then withdrawing said feeding means.

16. The method of molding articles of plastic material comprising preheating closely spaced preforms thereof, then by gravity substantially simultaneously dispersing them to more widely separated position, corresponding substantially with the position in which they will be molded, in feeding means where they are held preparatory to feeding them into a molding press, moving said charged feeding means and discharging the heated preforms therefrom into said molding press, and then closing said press and molding said preforms to the desired shape.

17. The method of molding articles of plastic material comprising quickly dielectrically preheating preforms thereof in a compact assembly and then by gravity substantially simultaneously dispersing them to more widely separated position, corresponding substantially with the position in which they will be molded, in feeding means where they are held preparatory to feeding them to a molding press, moving said feeding means and discharging said preforms therefrom into said press, and then closing said press and molding said preforms to the desired shape.

18. The method of molding articles of plastic material comprising preheating closely spaced preforms thereof, then by gravity substantially simultaneously dispersing them to more widely separated position, corresponding substantially with the position in which they will be molded, in feeding means where they are held preparatory to feeding them to lower mold elements of a molding press, removing said feeding means, closing said press and molding said preforms to the desired shape, opening said press, carrying the molded articles with the upper mold elements thereof, and discharging the molded articles from said upper mold elements while directing them from said press.

19. The method of molding articles of plastic material, comprising feeding preforms of said material into compact assembly in transfer means, moving said transfer means to heating means, preheating said preforms while in said transfer means, then by gravity substantially simultaneously dispersing them to more widely separated position, corresponding substantially with the position in which they will be molded, in feeding means where they are held preparatory to feeding them to a molding press, moving said feeding means to a position above the lower mold elements of a press, discharging said preforms therefrom into said lower mold elements, withdrawing said feeding means, closing said press and molding said preforms to the desired shape, opening said press carrying the molded articles with the upper mold elements, and discharging said articles into said means for guiding them for gravity discharge from said press.

20. The method of molding articles of plastic material comprising preheating preforms thereof while close together, and then by gravity substantially simultaneously dispersing them to more widely separated position, corresponding substantially with the position to which they will be molded, in means where they are held preparatory to molding said preforms to the desired shape.

21. The method of molding articles of plastic material comprising preheating preforms thereof while close together, then by gravity substantially simultaneously dispersing them to more widely separated position, corresponding substantially with the position in which they will be molded, in means where they are held preparatory to placing them in molding means, molding said preforms in upper and lower mold elements to form articles of the desired shape, carrying the molded articles with the upper mold elements, and simultaneously forcibly separating the molded articles from said upper mold elements while directing them diagonally downward and outward from said press.

JAMES H. GREEN.
WILLIAM MAKENNY.

References Cited in the file of this patent

UNITED STATES PATENTS

| Number | Name | Date |
|---|---|---|
| 1,495,178 | Hodgdon | May 27, 1924 |
| 1,535,424 | Launderville | Apr. 28, 1925 |
| 1,540,389 | Felton | June 2, 1925 |
| 1,545,376 | Weatherby | July 7, 1925 |
| 1,651,605 | Kuhn et al. | Dec. 6, 1927 |
| 2,155,316 | Lauterbach | Apr. 18, 1939 |
| 2,228,614 | Soubier et al. | Jan. 14, 1941 |
| 2,278,643 | Braun | Apr. 7, 1942 |
| 2,314,120 | Braun | Mar. 16, 1943 |
| 2,379,724 | Lanham | July 3, 1945 |
| 2,394,260 | Pfeilsticker | Feb. 5, 1946 |
| 2,409,725 | Whitmore et al. | Oct. 22, 1946 |
| 2,467,440 | Meharg et al. | Apr. 19, 1949 |

OTHER REFERENCES

"Thermex," Adver. sheet, Girdler Co., Louisville, Ky., 1944.

Modern Plastics, "Infrared for Drying and Preheating" by William J. Miskella, pages 110, 111 and 182 (August 1944).